United States Patent [19]

Tanaka et al.

[11] Patent Number: 5,179,482
[45] Date of Patent: Jan. 12, 1993

[54] DISK DRIVE WITH OPTICAL ENCODER HAVING INTEGRAL SCALE MEMBER

[75] Inventors: Tooru Tanaka; Keiichi Ohta; Mamoru Osato, all of Kanagawa, Japan

[73] Assignee: Sony Corporation, Tokyo, Japan

[21] Appl. No.: 742,510

[22] Filed: Jul. 5, 1991

Related U.S. Application Data

[63] Continuation of Ser. No. 369,202, Jun. 21, 1989, abandoned.

[30] Foreign Application Priority Data

Jun. 21, 1988 [JP] Japan ................... 63-152874
Aug. 12, 1988 [JP] Japan ................... 63-201101

[51] Int. Cl.$^5$ .................. G11B 5/012; G11B 5/596; G11B 5/55
[52] U.S. Cl. ............... 360/97.01; 360/78.11; 360/106
[58] Field of Search .............. 360/97.01, 77.03, 77.02, 360/75, 78.12, 76, 97.02, 78.04, 78.11; 250/231.14, 231.16, 237 G

[56] References Cited

U.S. PATENT DOCUMENTS

| | | | |
|---|---|---|---|
| 4,291,346 | 9/1981 | Beecroft et al. | 360/77.03 |
| 4,325,016 | 4/1982 | Takeuchi | 360/77.03 |
| 4,524,397 | 6/1985 | Chalmers et al. | 360/77.03 |
| 4,570,191 | 2/1986 | Di Stefano et al. | 360/77.03 |
| 4,587,579 | 5/1986 | Cocke et al. | 360/75 |
| 4,593,194 | 6/1986 | Graham et al. | 250/231.16 |
| 4,625,109 | 11/1986 | Nixon | 250/231.14 |
| 4,639,798 | 1/1987 | Harrison et al. | 360/73.03 |
| 4,639,863 | 1/1987 | Harrison et al. | 360/98.01 |
| 4,647,769 | 3/1987 | Stone et al. | 250/231.16 |
| 4,814,909 | 3/1989 | Brown et al. | 360/77.04 |
| 4,816,939 | 3/1989 | Ford et al. | 360/77.03 |
| 4,819,153 | 4/1989 | Graham et al. | 360/77.04 |
| 4,831,470 | 5/1989 | Braunett et al. | 360/97.01 |
| 5,005,089 | 4/1991 | Thanos et al. | 360/77.03 |

FOREIGN PATENT DOCUMENTS

| | | | |
|---|---|---|---|
| 0104941 | 4/1984 | European Pat. Off. | |
| 2325958 | 12/1973 | Fed. Rep. of Germany | 360/77.03 |
| 53120403 | 8/1980 | Japan | |
| 56-121108 | 9/1981 | Japan | |

*Primary Examiner*—Stuart S. Levy
*Assistant Examiner*—Craig A. Renner
*Attorney, Agent, or Firm*—Hill, Van Santen, Steadman & Simpson

[57] ABSTRACT

A disk recording and/or reproducing apparatus performs recording information on and/or reproducing information from a disk-like recording medium within a sealed receptacle by the use of a head. In the apparatus, an optical encoder for detecting positions of the head with respect to the disk-like recording medium has such a scale plate as to be swingable on the arm shaft of a head arm together with the head arm, as to have scale marks engraved in the radius direction of the arm shaft, and as to consist of a single member in whole, so that a trouble such as the head is off the track due to a thermal influence and so forth, never occurs.

3 Claims, 18 Drawing Sheets

DISK DRIVE WITH OPTICAL ENCODER HAVING INTEGRAL SCALE MEMBER

This is a continuation of application Ser. No. 369,202, filed Jan. 21, 1989, now abandoned.

BACKGROUND OF THE INVENTION

1. Field of the Invention

This invention relates to a disk recording and/or reproducing apparatus, and is best applicable to the apparatus used for hard disks and having an optical encoder for controlling positions of a head with respect to the disks.

2. Description of the Prior Art

U.S. Pat. Nos. 4593194, 4625109, 4647769, etc. are prior arts of the optical encoder for regulating the head always into its correct position when the apparatus is used for the hard disk. All the head arms included in the optical encoders shown in such prior arts are constituted as illustrated in FIG. 18.

In FIG. 18, a pair of upper and lower floating heads 204 used for recording information on and/or reproducing information from the hard disk 203 are secured to one end of an aluminium head arm 202 which is swung on an arm shaft 201, and a stainless-steel wing 205 is secured to the other end of the head arm 202. Further, secured to the free end of the wing 205 is a glass scale plate 207 of the optical encoder 206.

On the glass scale plate 207, scale marks 208 extending in the radius direction of the arm shaft 201 are formed into an arc round the arm shaft 201, and on the upper side and the lower side of the scale plate 207, a light-emitting element 210 and a light-sensitive element 211 of a photo coupler 209 are fixedly arranged, respectively, so that the photo coupler 209 can detect the scale marks.

When the hard disk 203 is rotated at high speed on the one hand, and the head arm 202 is swung, on the other hand, in a direction of arrow a on the arm shaft 201 by a motor (not shown), so as to record information on or reproduce information from the hard disk 203 by the use of the head 204, the glass scale plate 207 is moved together with the head arm 202, and thereby, tracking by the head 204 is controlled due to optical detection of the scale marks 208 by the photo coupler 209.

However, in the optical encoder disclosed in the prior art, thermal offtrack errors are often produced. As shown in FIG. 18, when the center PC of the photo coupler 209 coincides with the central line SC of the scale marks 208, the head 204 is positioned over the central line MD of the recorded zone of the hard disk 203, which is defined by an outer limit OD and an inner limit ID. At that time, if the temperature rises, the aluminum head arm 202 and stainless-steel wing 205 expand in a direction of axis Y, and as the result, the glass scale plate 207 is moved in a position indicated in two-dots-and-dash lines in FIG. 18. But the coefficient of expansion of glass is much smaller than those of aluminium and stainless steel, so that point $A_1$ on the glass scale plate 207 moves to point $A_2$, because the glass scale plate 207 slightly expands in a direction of axis X, as compared with the expansion of the head arm 202 and wing 205 in the direction of axis Y.

If the head arm 202 is moved on the same number of tracks under the different atmospheric temperatures, the different angles of rotation $\theta_1$ and $\theta_2$ are made. In other words, there is produced the thermal offtrack error 2 corresponding to the difference of the angles $(\theta_1-\theta_2)$. A larger coefficient of glass must be selected in order to move point $A_1$ to point $A_3$ shown in FIG. 18.

Moreover, in the prior art, the center of gravity of the assembly which consists of the head arm 202, wing 205 and glass scale plate 207 is positioned apart from the center of the arm shaft 201, so that it is difficult to move the head 204 at high speed. In addition, it is very difficult to assemble the wing 205 and the scale plate 207, because the center of the scale marks 208 must be made to coincide with the center of the arm shaft 201 with accuracy of about 10 μm, when the scale plate 207 is adhered to the wing 205.

OBJECTS AND SUMMARY OF THE INVENTION

Accordingly, it is an object of the present invention to provide a disk recording and/or reproducing apparatus, in which information is recorded on and/or reproduced from a disk-like recording medium set within a sealed receptacle, by the use of a head, and an optical encoder for detecting the position of the head with respect to the disk-like recording medium, has such a scale plate as to be swingable on the arm shaft of a head arm together with the head arm, as to have a plurality of scale marks engraved in the radius direction of the arm shaft, and as to consist of a single member in whole, so that a trouble such as the head is off the track due to a thermal influence, is prevented, and high density recording can be achieved.

Another object of the invention is to provide a disk recording and/or reproducing apparatus, in which a scale plate belonging to an optical encoder is swung together with a head arm on the arm shaft, so that inertia of the head arm and scale plate can be reduced, and thereby, the head can be moved at high speed.

A further object of the invention is to provide a disk recording and/or reproducing apparatus, in which a scale plate belonging to an optical encoder is directly secured to the arm shaft of a head arm, so that it is easy to make the center of rotation of the scale plate coincide with the arm shaft when they are assembled, and as the result, it becomes possible to automatically assemble the head arm and the scale plate.

Still a further object of the invention is to provide a disk recording and/or reproducing apparatus, in which the coefficient of expansion of a scale plate belonging to an optical encoder is free in value, and as the result, the scale plate can be inexpensively made of cheap materials, such as glass so as to reduce the cost of the optical encoder.

Still another object of the invention is to provide a disk recording and/or reproducing apparatus, which is accommodated in a sealed receptacle, and in which a head arm on which heads are mounted, and an optical encoder for detecting positions of the heads with respect to a disk recording medium, are secured to a mounting plate so as to constitute a modular encoder assembly which can mount on and demount from the sealed receptacle through the mounting plate, and thus, it becomes easy to assemble, disassemble, adjust or repair the apparatus, or change the encoder assembly, because the optical encoder assembly can be simply mounted on the sealed receptacle, after assembled and adjusted.

Still another object of the invention is to provide a disk recording and/or reproducing apparatus, as aforesaid, in which as the optical encoder assembly is so constituted as to be capable of being easily joined to other parts or units, it becomes possible to use the optical encoder assembly as the common part of disk recording and/or reproducing apparatuses of various kinds, and as the results, their manufacturing cost can be reduced.

Still another object of the invention is to provide a disk recording and/or reproducing apparatus, as aforesaid, in which a circuit of detecting positions of the head is provided in a circuit board disposed in the mounting plate of the optical encoder assembly in order that the optical encoder assembly is easily joined mechanically and electrically to other parts or units. Thus, it becomes easy to mechanically and electrically assemble, disassemble, adjust or repair the apparatus, or change the optical encoder assembly, when the optical encoder assembly is used as the common part of the disk recording and/or reproducing apparatuses of various kinds.

In accordance with an aspect of this invention, in a disk recording and/or reproducing apparatus for recording information on and/or reproducing information from a disk-like recording medium by the use of a head, the disk recording and/or reproducing apparatus comprises a sealed receptacle; a disk drive motor accommodated in the receptacle, and capable of rotating the disk-like recording medium; a head arm accommodated in the receptacle, and swung on an arm shaft so as to move the head in substantially the radius direction of the disk-like recording medium; a head drive motor accommodated in the receptacle, and capable of making the head arm swing on the arm shaft; and an optical encoder accommodated in the receptacle and, capable of detecting positions of the head with respect to the disk-like recording medium; wherein the optical encoder has a scale plate which is swung together with the head arm on the arm shaft, and consists of a single member in whole; a light-emitting element arranged on one side of the scale plate in opposed relation to scale marks which are engraved in the scale plate in the radius direction of the arm shaft; a light-sensitive element arranged on the other side of the scale plate in opposed relation to the scale marks; and a reticle plate arranged between the light-sensitive element and the scale plate, so that the light emitted from the light-emitting element and traveled through the scale plate and reticle plate, is absorbed by the light-sensitive element, and thus, positions of the head with respect to the disk-like recording medium can be detected due to a signal given by the light-sensitive element, because the scale plate is swung together with the head arm.

Moreover, in the disk recording and/or reproducing apparatus for recording information on and/or reproducing information from the disk-like recording medium by the use of the head, the disk recording and/or reproducing apparatus comprises a sealed receptacle; a disk drive motor accommodated in the receptacle, and capable of rotating the disk-like recording medium; a head arm accommodated in the receptacle, and swung on an arm shaft so as to move the head in substantially the radius direction of the disk-like recording medium; a head drive motor accommodated in the receptacle, and capable of making the head arm swing on the arm shaft; and an optical encoder assembly having a mounting plate, the head arm, which is secured to the mounting plate and swingable on the arm shaft, and an optical encoder so disposed on the mounting plate as to be mounted in and demounted from the receptacle; wherein the optical encoder has a scale plate which is swung together with the head arm on the arm shaft, and consists of a single member in whole; a light-emitting element and a light-sensitive element provided on the mounting plate, on opposite sides of the scale plate, and in opposed relation to scale marks which are engraved in the scale plate in the radius direction of the arm shaft; and a reticle plate arranged between the light-sensitive element and the scale plate and disposed on the mounting plate, so that the light emitted from the light-emitting element and traveled through the scale plate and reticle plate, is absorbed by the light-sensitive element, and thus, positions of the head with respect to the disk-like recording medium can be detected due to a signal given by the light-sensitive element, because the scale plate is swung together with the head arm.

In a preferred embodiment of this invention, a circuit board which has a circuit of detecting positions of the head, is secured to the optical encoder assembly.

The above, and other objects, features and advantages of this invention, will be apparent in the following detailed description of an illustrative embodiment thereof which is to be read in connection with the accompanying drawings wherein like reference numerals identify the corresponding parts in the several views.

DETAILED DESCRIPTION OF A PREFERRED EMBODIMENT

Figure 1:
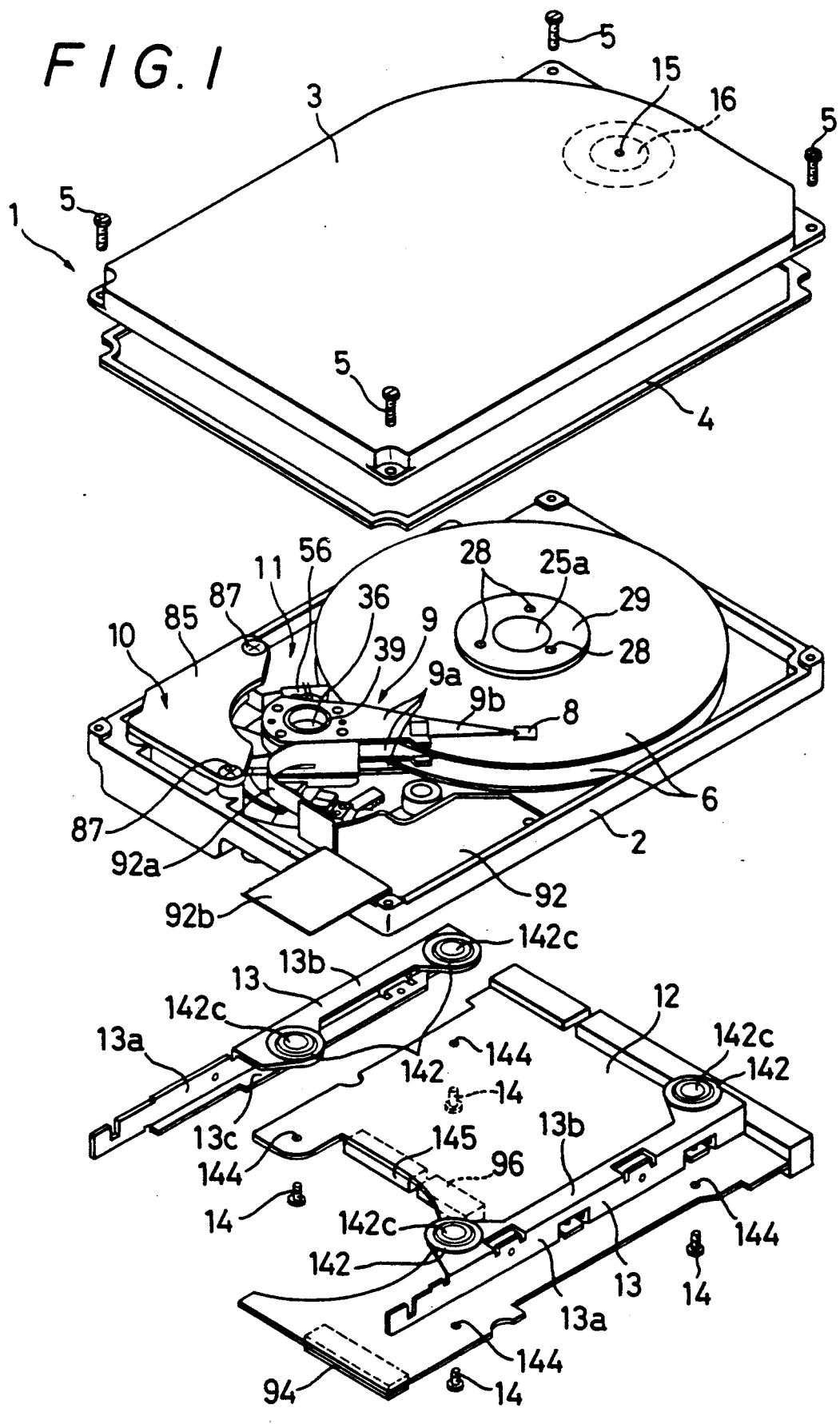
FIG. 1 is an exploded, perspective view of a disk recording and/or reproducing apparatus according to an embodiment of this invention.
Figure 2:
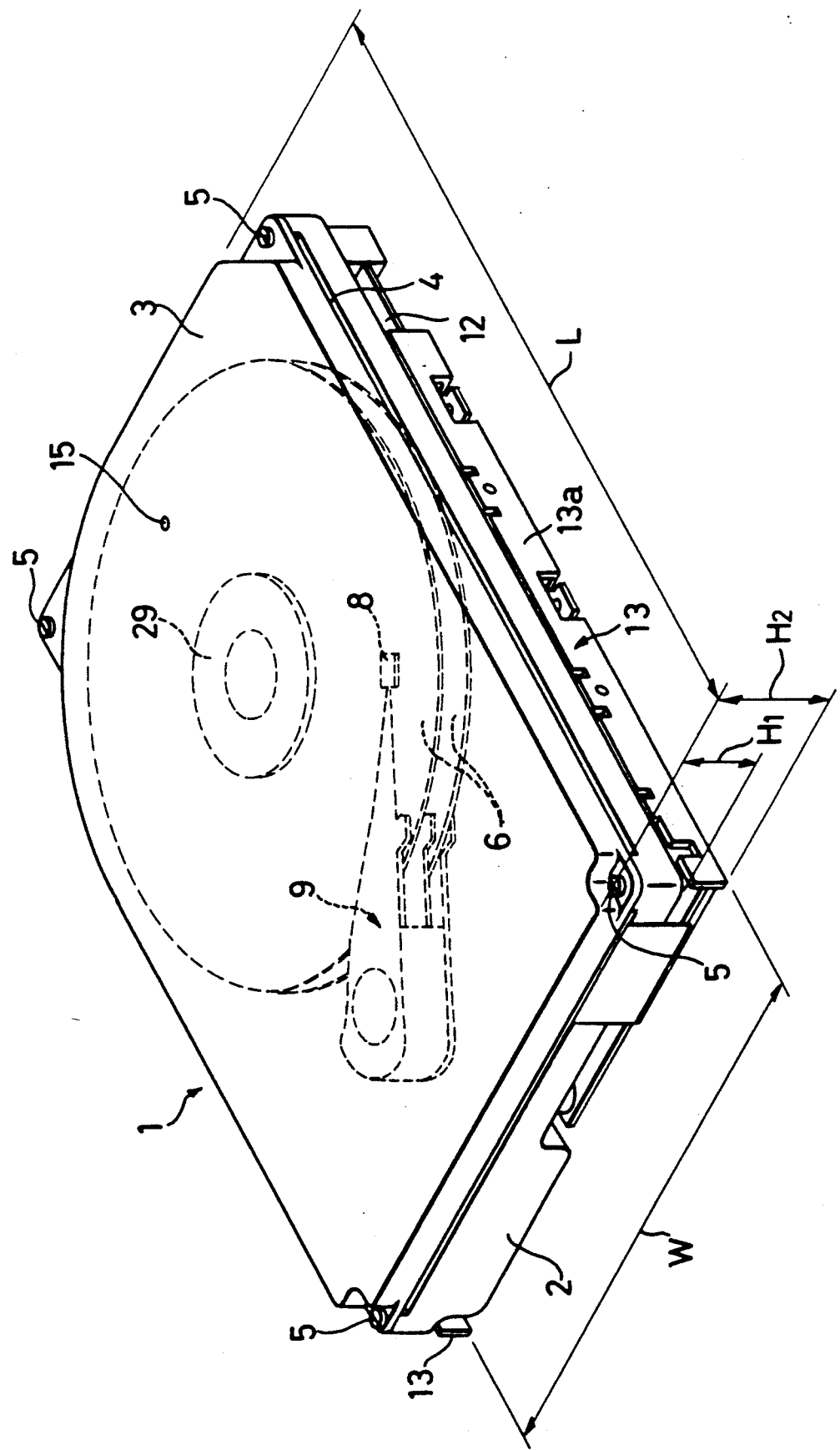
FIG. 2 is a perspective view of the disk recording and/or reproducing apparatus of FIG. 1.
Figure 3:
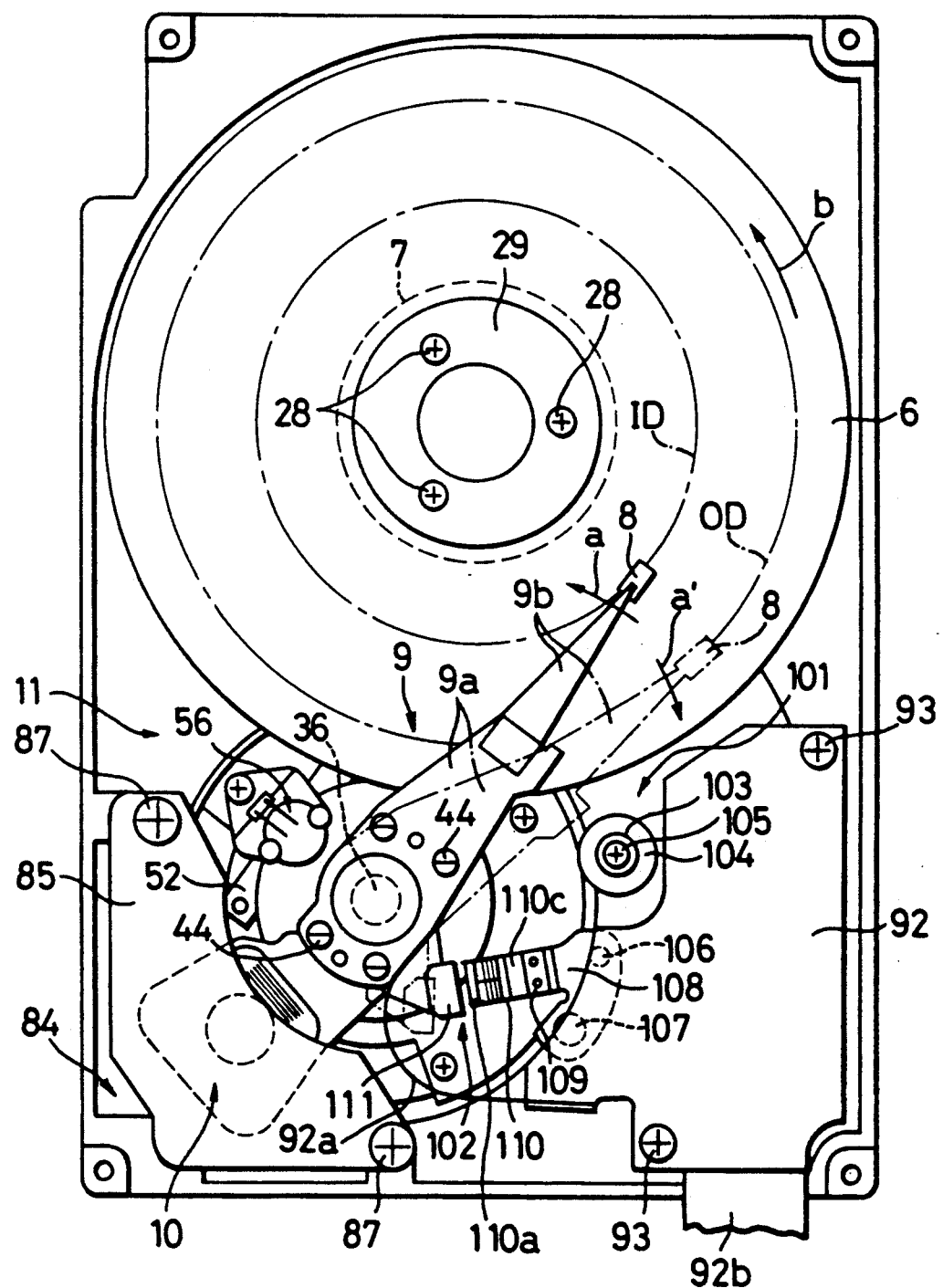
FIG. 3 is a plan view, having a cover removed, of the disk recording and/or reproducing apparatus of FIG. 1.

Referring to the drawings in detail, and initially to FIGS. 1 to 3 thereof, it will be seen that a disk recording and/or reproducing apparatus has a sealed receptacle 1. The receptacle 1 is made by aluminium die-casting or the like, and comprises a shallow body 2 opened at its top, and a shallow cover 3 opened at its bottom. A packing 4 is inserted in the joint between the body 2 and the cover 3, and the receptacle 1 is tightened with four screws 5 screwed at each corner of the rectangular receptacle 1.

Accommodated in the sealed receptacle 1 are more than one hard disks 6 used as a recording medium, for example, a plurality of hard disks 6 which are ranged in a vertical direction; a disk drive motor 7 for rotating the hard disks 6; a plurality of upper and lower heads 8 used for recording information on or reproducing information from the hard disk 6; a head arm 9 for supporting the heads 8; a head drive motor 10; and a modular optical encoder assembly including the head arm 9. Further, a main circuit board comprising a printed circuit board is horizontally secured with screws 14 to the bottom side of the body 2 together with four mounting frames 13, through which the apparatus is mounted on a computer and so forth, and as shown in FIG. 1, a breathing hole 15 with a filter 16 is provided in the cover 3.

The dimensions L and W are shown in FIG. 2. H1 is the height of the disk assembly, and H2 is the full height, including the circuit board.

Figure 4:
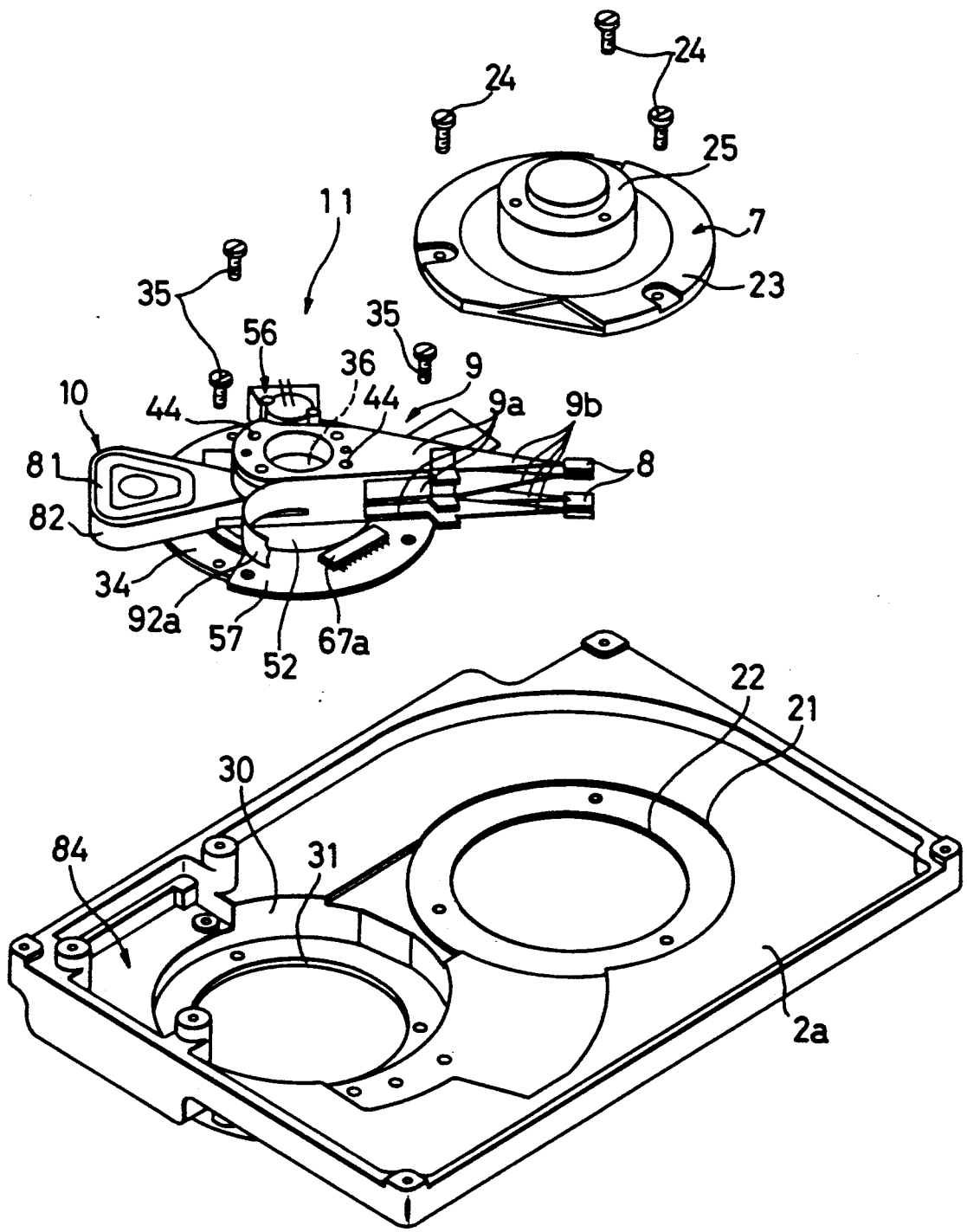
FIG. 4 is an exploded, perspective view of the disk recording and/or reproducing apparatus shown in FIG. 3.
Figure 5:
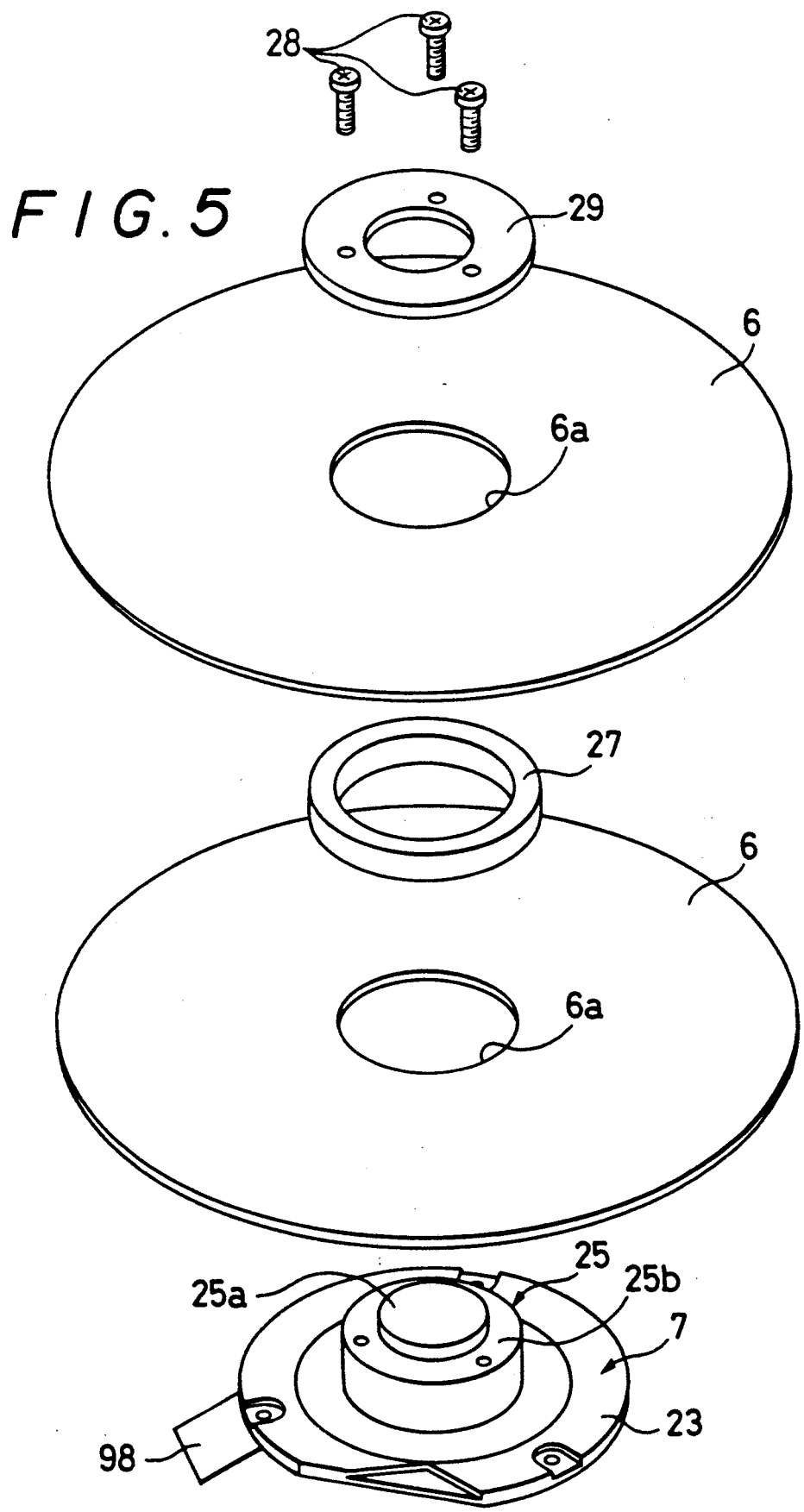
FIG. 5 is an exploded, perspective view of a disk drive motor and hard disks mounted thereon appearing on FIG. 1.
Figure 6:
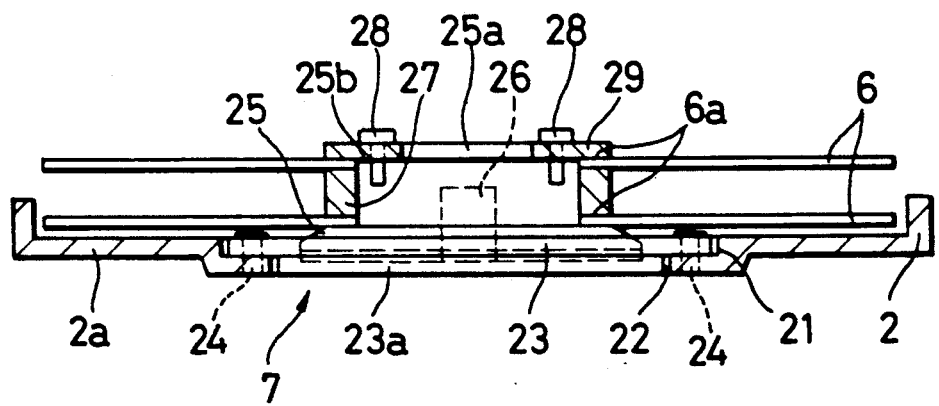
FIG. 6 is a sectional view of a disk drive motor and hard disks thereon appearing on FIG. 1.

As shown in FIGS. 4 to 6, a shallow circular recess 21 is disposed in the bottom wall 2a of the body 2, and at the center of the recess 21, a circular opening 22 is provided. Into the recess 21, a stator 23 with coils (not shown), which is a part of the disk drive motor 7, is fitted from above, and fixed with screws 24. Further, a circular projection 23a projects downwards from the stator 23 and is inserted into the opening 22. The opening 22 is closed by the stator 23.

A rotor 25 with a magnet (not shown) of the disk drive motor 7 is rotatably mounted on a shaft 26 which projects upwards from the center of the stator 23, and the lower end of the rotor 25 is loosely fitted in a recess provided in the stator 23. Each hard disk 6 which has an insertion hole 6a provided at the center thereof, and an annular spacer 27 inserted between the hard disks 6 are mounted in turn in a shaft 25a which vertically projects upwards from the center of the rotor 25. The hard disks 6 and the annular spacer 27 are pressed against a step portion 25b provided at the lower end of the shaft 25a due to the force of a circular pressing plate 29 which is secured with screws 28 to the top surface of the shaft 25a.

As shown in FIG. 4, a deep circular recess 30 is also provided in the bottom wall 2a of the body 2, and at the center of the recess 30, a circular opening 31 is bored. The optical encoder assembly 11 is fitted from above into the recess 30, and secured with screws 35 to the body 2 through a mounting plate 34 of the assembly 11.

Figure 8:
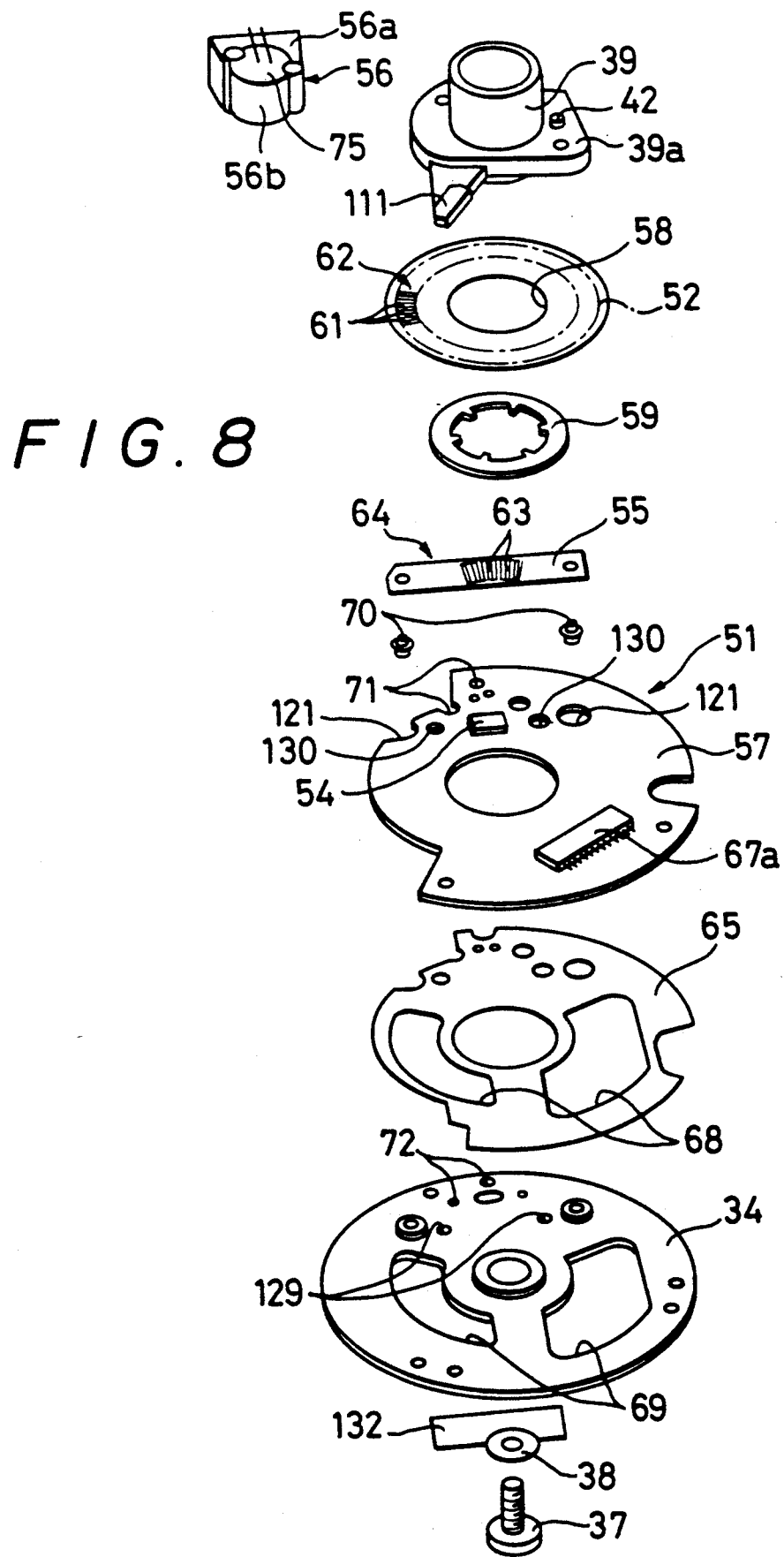
FIG. 8 is a exploded, perspective view of an optical encoder appearing on FIG. 7.
Figure 9:
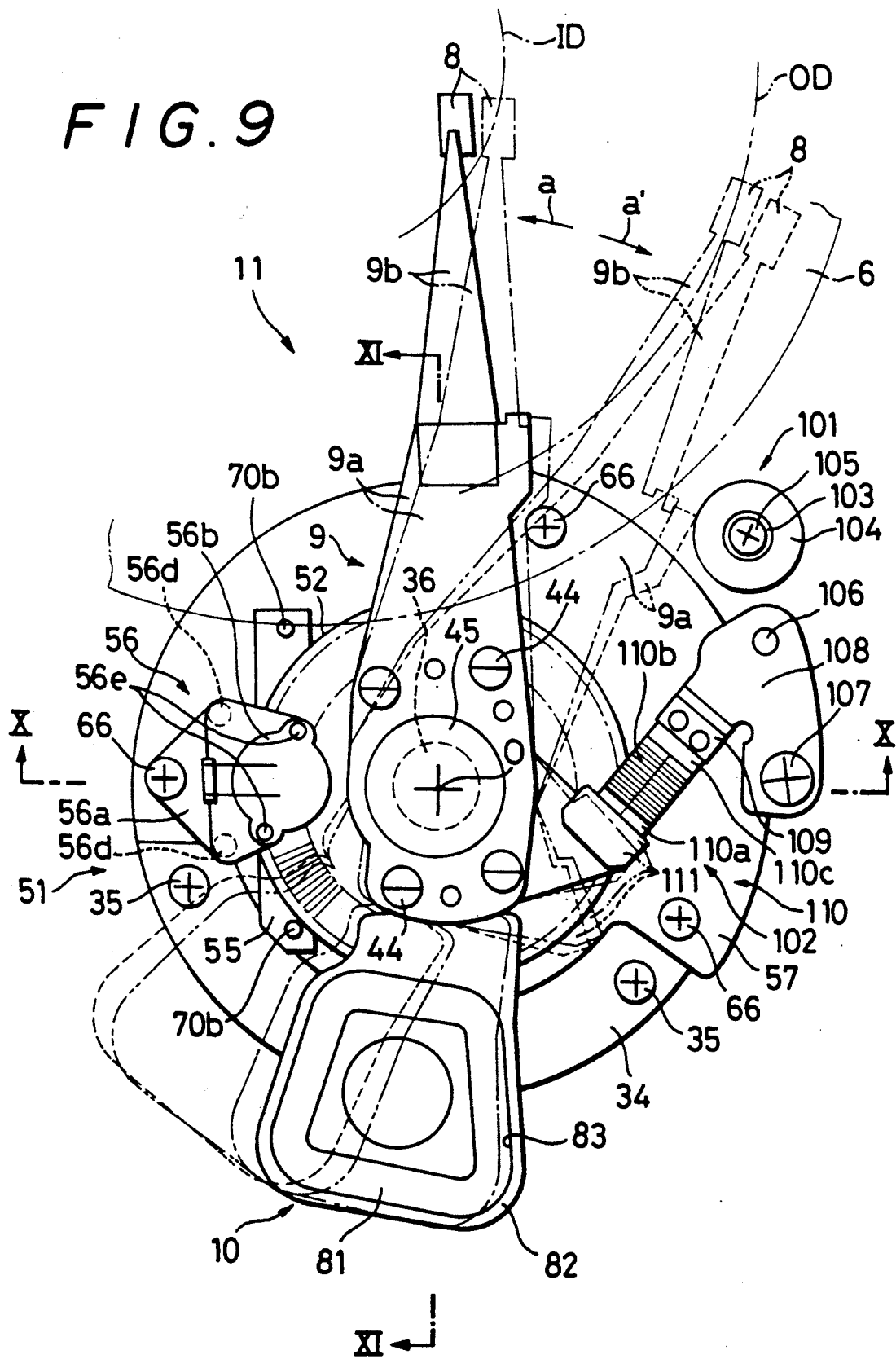
FIG. 9 is a plan view, on an enlarged scale, of an optical encoder assembly appearing on FIG. 3.
Figure 10:
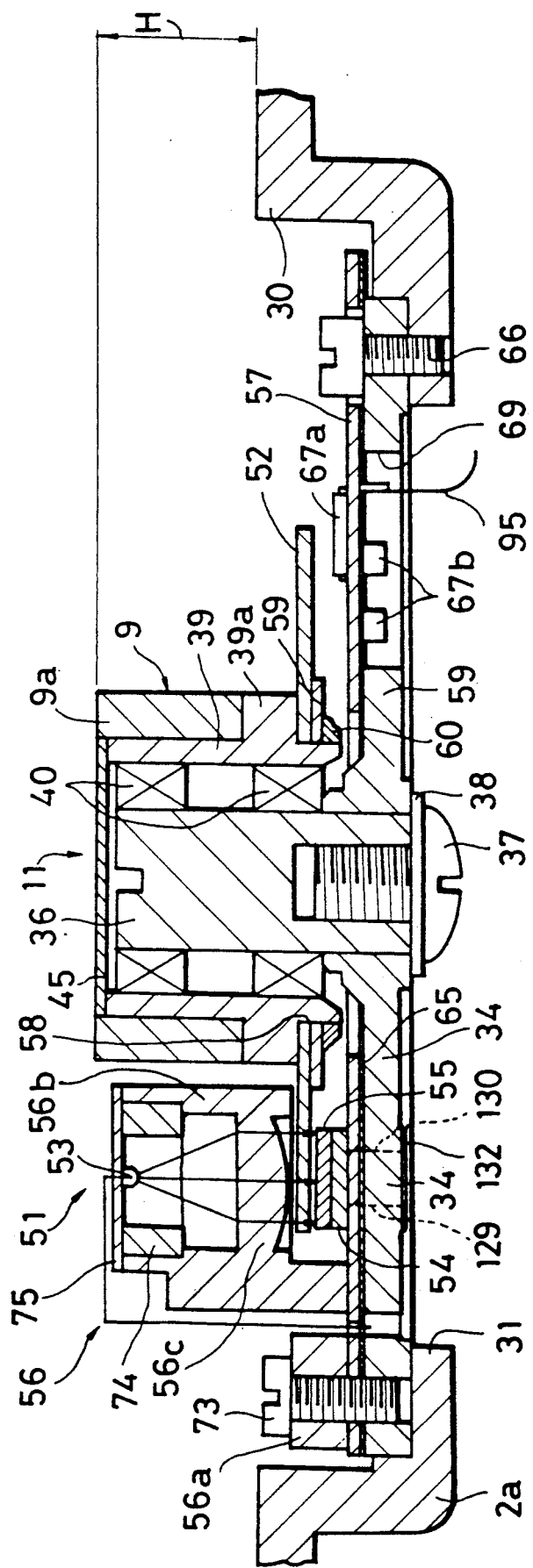
FIG. 10 is a sectional view taken along the line X—X on FIG. 9.
Figure 11:
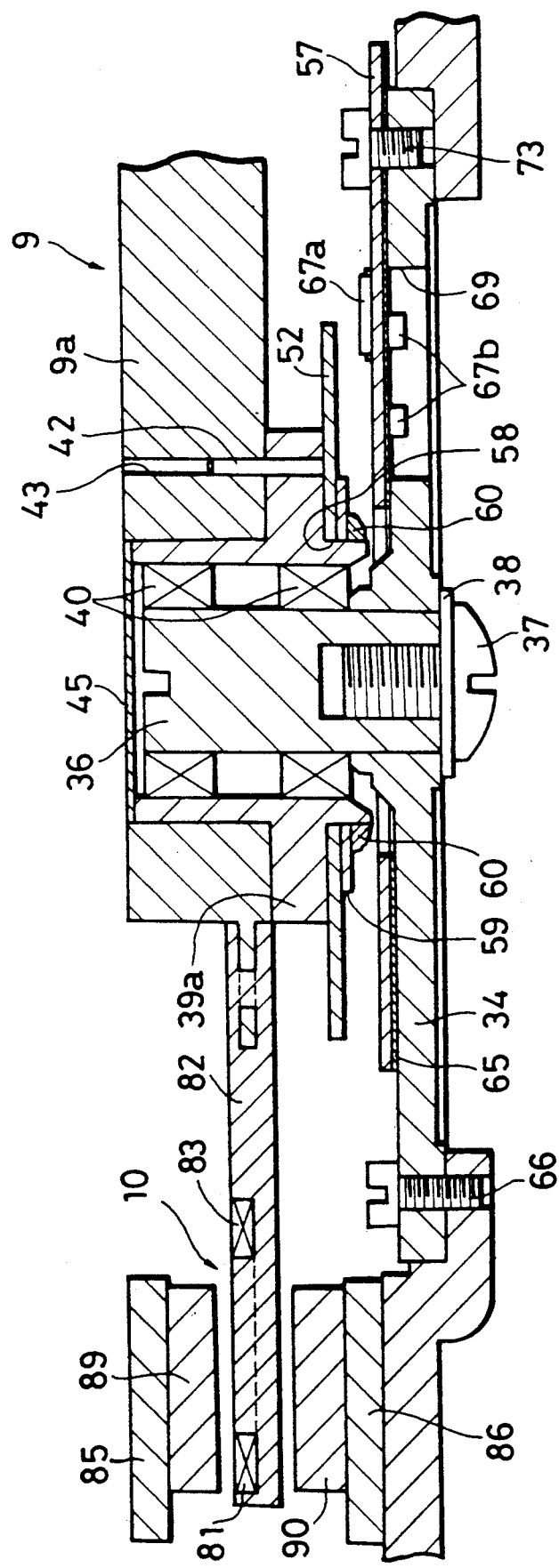
FIG. 11 is a sectional view taken along the line XI—XI on FIG. 9.

Next, as shown in FIGS. 3, 4 and 7 to 11, an arm shaft 36 of the optical encoder assembly 11 is secured with a screw 37 and a washer 38 shown in FIG. 10, or by force fit to the center of the mounting plate 34 which is made of steel or the like. The boss 39 of the head arm 9 is rotatably mounted on the shaft 36 through a pair of upper and lower bearings 40.

The body 9a of the head arm 9 made of aluminium or the like is mounted from above on the boss 39, and horizontally placed on a flange 39a which is formed integrally with, and near the lower end of the boss 39. Then, the body 9a of the head arm 9 engaged with the flange 39a through a positioning pin 42 projecting from the flange 39a, and a positioning hole 43 bored in the body 9a is fixedly secured to the flange 39a with screws 44 which are passed through the hole 43. The bore 41 of the head arm 9 engaged with the boss 39 is covered by a circular lid 45, which is adhered to the head arm 9 by adhesives or the like. The plurality of floating heads 8 are secured to the end of the body 9a through a plurality of leaf springs 9b.

An optical encoder 51 secured to the assembly 11 comprises a scale plate 52 made of a disk-like glass plate; a light-emitting element 53, such as a light emitting diode or the like; a light-sensitive element 54, such as a photodiode or the like; a reticle plate 55 made of a rectangular glass or the like; a lens housing 56; and a circuit board 57 which is printed and partly circular in shape. The scale plate 52 has a circular hole 58 at the center thereof and is mounted in the boss 39 of the head arm 9 so as to be sandwiched between the lower face of the flange 39a and a lock washer 59 which is forcibly mounted the boss 39. The scale plate 52 and the washer 59 are then adhered to the boss 39 by an adhesive 60. Thus, the scale plate 52 made of a single glass plate and fixed to the boss 39, can be swung on the arm shaft 36 together with the head arm 9.

On the scale plate 52, scale marks 61 are circularly marked-off in the radius direction of the arm shaft 36 at regular intervals (an annular scale 62). Also on the reticle plate, four scales 64 are marked off. The scale marks 63 of those scales 64 are different in phase from one another, but the same in scale interval as those of the scale 62 (see FIG. 15).

The circuit board 57 is secured with screws 66 to the mounting plate 34. A shim 65 inserted between the circuit board 57 and the mounting plate 34 functions as an isolator and a seal. Both surfaces of the circuit board 57 are available, and electric parts 67a, 67b are mounted on both these surfaces. Thus, a circuit of amplification and detection of positions necessary for the optical encoder 51 is produced. As the electric parts 67b mounted on the lower surface of the board 57 are inserted into through holes 68 and 69 which are provided in the mounting plate 34 and the shim 65, so that it is unnecessary to space the circuit board 57 apart from the mounting plate 34. The opening 31 of the recess 30 is closed by the mounting plate 34 and the edges of the through holes 68 and 69 are sealed by the shim 65.

Next, the light-sensitive element 54 is arranged in opposed relation to the scale 62 of the reticle plate 52, and mounted on the circuit board 57. The reticle plate 55 also arranged in opposed relation to the scale 62 is horizontally placed between the scale plate 52 and the light-sensitive element 54, and secured with a pair of pins 70 to the mounting plate 34. As shown in FIG. 9, a transparent lens-housing 56 made of polycarbonate resin or the like, comprises a base portion 56a; a cylindrical portion 56b which is vertically disposed at one side of the base portion 56a; a lens 56c which is disposed at the lower part of the cylindrical portion 56b; a pair of positioning pins 56d which are disposed in the lower part of the base portion 56a at the same side that the cylindrical portion 56b is disposed; and a pair of welded projections 56e provided at the top of the cylindrical portion 56b.

As shown in FIGS. 8 to 10, the pair of positioning pins 56d of the lens-housing 56 are fitted in a pair of through holes 71 provided in the circuit board 57 and a pair of positioning holes 72 provided in the mounting plate 34, and the lens-housing 56 is then secured to the mounting plate 34 with a screw 73 which passes through the circuit board 57. When the lens-housing 56 is secured, the lens 56c is arranged in opposed relation to the scale 62 of the scale plate 52 and just over the light-sensitive element 54. An annular spacer 74 is fitted in the inside of the upper end of the cylindrical portion 56b, and a lid 75 horizontally placed on the cylindrical portion 56b of the lens-housing 56 is fixed to the top of the cylindrical portion 56b with the welded projections 56e. At that time, the light-emitting element 53 secured to the center of the lower face of the lid 75 is arranged in opposed relation to the scale 62 of the scale plate 52 and just over the lens 56c accommodated in the cylindrical portion 56b.

As the result, the mounting plate 34, the arm shaft 36, and the boss 39 of the optical encoder assembly 11 are accommodated substantially in the recess 30 of the bottom wall 2a of the receptacle 1 as shown in FIG. 10, and the light-emitting element 53, the light-sensitive element 54, the reticle plate 55, the lens-housing 56 and the circuit board 57 of the optical encoder assembly 11 are accommodated in the spaces formed above and below the scale plate 52, the upper heights of the spaces being defined by the maximum height of the head arm 9. Thus, the height H of the optical encoder assembly 11 measured from the upper surface of the bottom wall 2a can be made very small.

Figure 7:
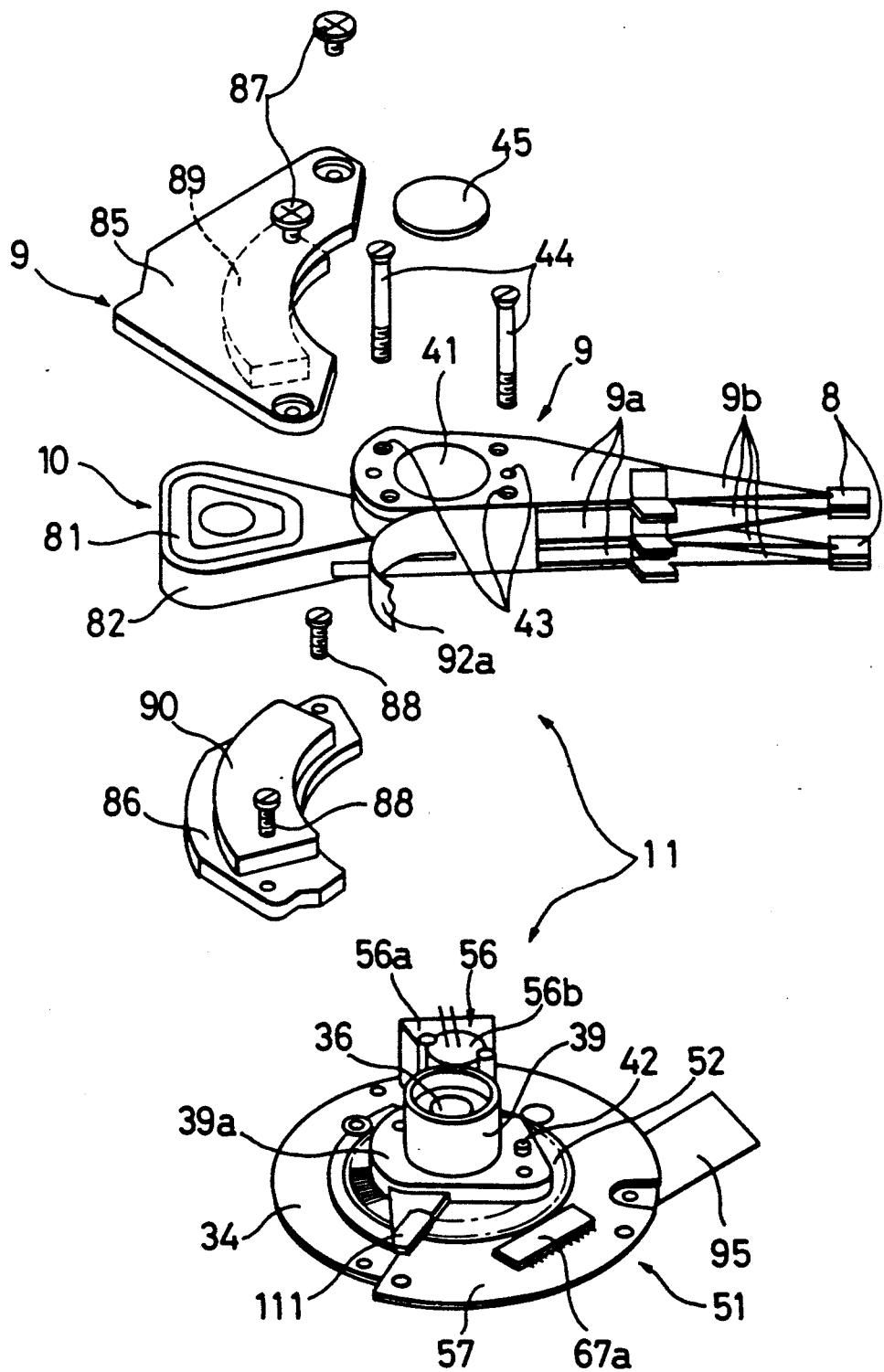
FIG. 7 is an exploded, perspective view of an optical encoder assembly appearing on FIG. 1.

Next, the head drive motor 10 comprises a segment motor as shown in FIGS. 3, 4, 9 and 11. A bobbin 82 made of synthetic resin is disposed at a side of the head arm 9 just opposite to the side where the heads 8 are mounted, and a coil 81 of the motor 10 is horizontally fitted in a groove 83 which is provided in the bobbin 82 as shown in FIG. 9, and fixed by adhesives or the like. As shown in FIG. 3 and 7, at one corner 84 of the receptacle 1, a pair of upper and lower yokes 85 and 86 are horizontally arranged above and below the bobbin 82, respectively, and secured with screws 87 and 88 to the bottom wall 2a of the receptacle 1. A pair of flat magnets 89 and 90 of sectorial shapes are fixed with adhesives or the like to the respective surfaces of the yokes 85 and 86, the flat magnets 89 and 90 being faced each other and placed near the coil 81.

As shown in FIG. 3, a relay board 92 comprising a flexible printed board is horizontally secured with screws 93 to the bottom wall 2a of the receptacle 1 at a neighboring corner. The relay board 92 is reinforced by an alminium plate (not shown), and on the board 92, electrical parts of various kinds are mounted. An elastic junction board 92a extending from the relay board 92 is bent into substantially a U-shape, and connected to a side of the head arm 9. The junction board 92a is then connected to the heads 8 through lead wires (not shown).

Figure 12:
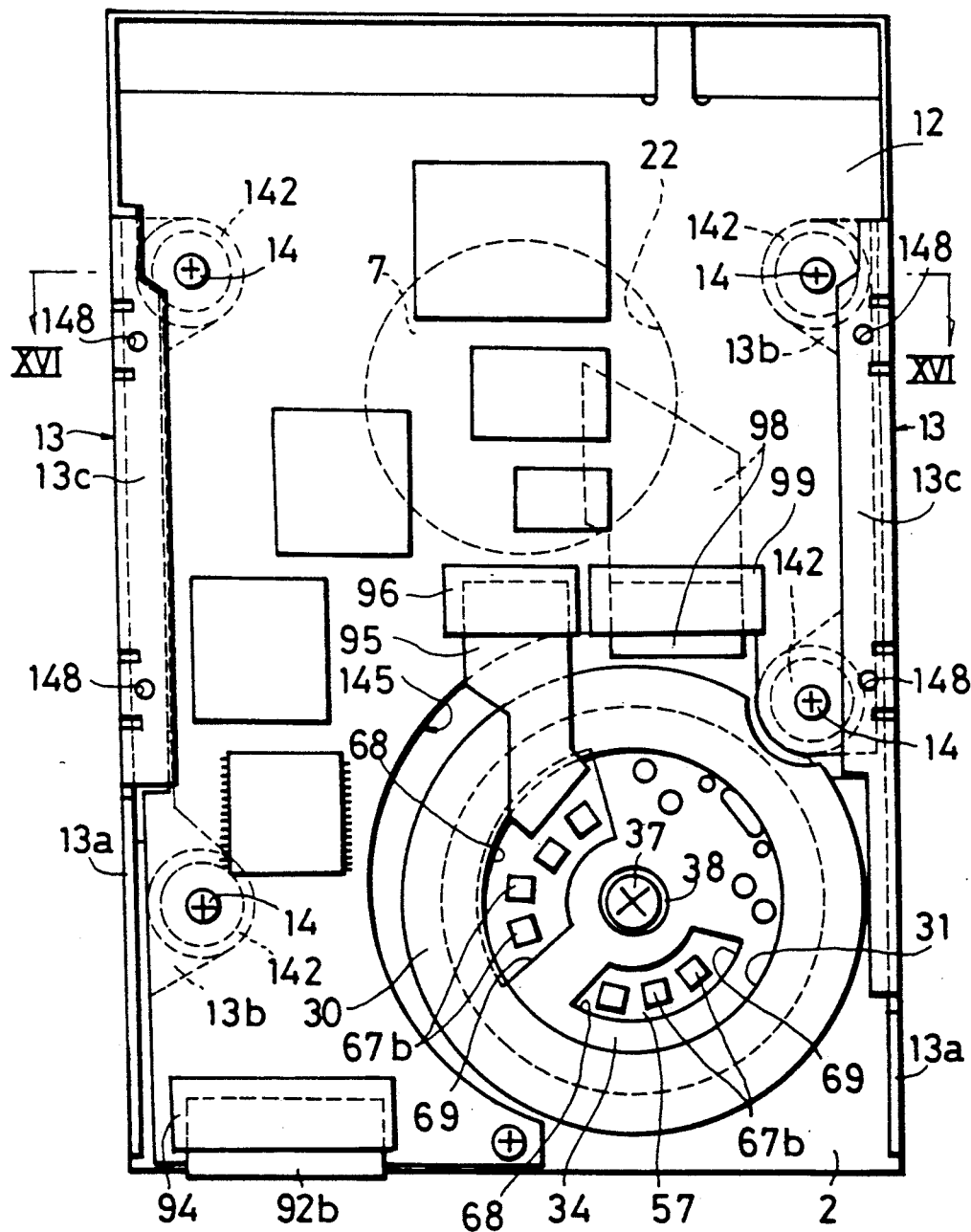
FIG. 12 is a bottom view of the disk recording and/or reproducing apparatus of FIG. 1.

Next, the other junction board 92b extending from the relay board 92 is drawn out from between the body 2 and the cover 3 of the receptacle 1, and connected to a connector 94 mounted on the main circuit board 12 as shown in FIG. 12. Further, as shown in FIGS. 10 and 12, a junction board 95 comprising a flexible printed board, and extending from the circuit board 57 of the optical encoder 51 is drawn out through the through holes 68 of the shim 65 and the through holes 69 of the mounting plate 34, and connected to a connector 96 mounted on the main circuit board 12.

Similarly, a junction board 98 comprising a flexible printed board, is drawn out downwards from the lower part of the stator 23 of the disk drive motor 7 through the hole 122 of the bottom plate 2a of the receptacle 1, and connected to a connector 99 mounted on the main circuit board 12.

In the main circuit board 12, a circuit necessary for recording information on and/or reproducing information from the plurality of hard disks 6; a circuit necessary for driving the disk drive motor 7 and the head drive motor 10; a circuit necessary for making the head arm 9 conduct tracking movements and amplifying tracking signals; a circuit necessary for detecting positions of the optical encoder 51 and amplifying detecting signals, etc. are included.

Next, as shown in FIGS. 3, 7 and 9, an outer stop 101 and an inner stop 102 of the head arm 9 are secured to the bottom wall 2a of the receptacle 1. The outer stop 101 comprises a sleeve 103 coated with rubber 104. The sleeve 103 is rotatably secured to the bottom wall 2a with a screw 105 passing through the sleeve 103. The inner stop 102 comprises an electromagnet 110 and a support plate 108 which is secured to the bottom wall 2a of the receptacle 1 with a positioning pin 106 and a screw 107, and on which the electromagnet 110 is mounted though a rubber plate 109. The electromagnet 110 has a iron core 110a and a coil 110b surrounding the iron core 110a, a magnet 110c being fixed to one end of the iron core 110a. A moving iron 111 secured to one side of the flange 39a of the boss 39 and swung together with the head arm 9 is attracted to the other end of the iron core 110a.

Figure 13:
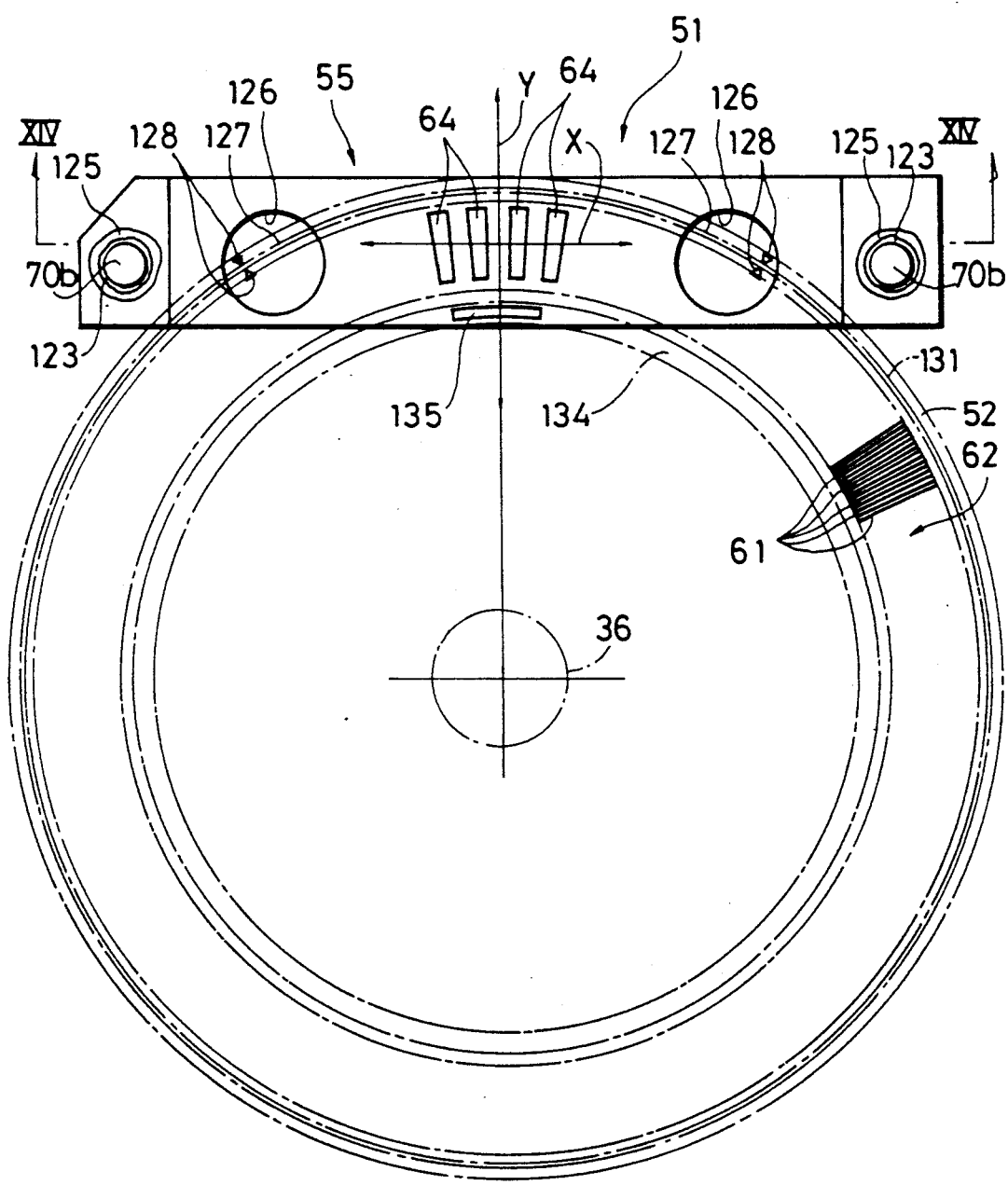
FIG. 13 is a plan view of a reticle plate appearing on FIG. 9.
Figure 14:
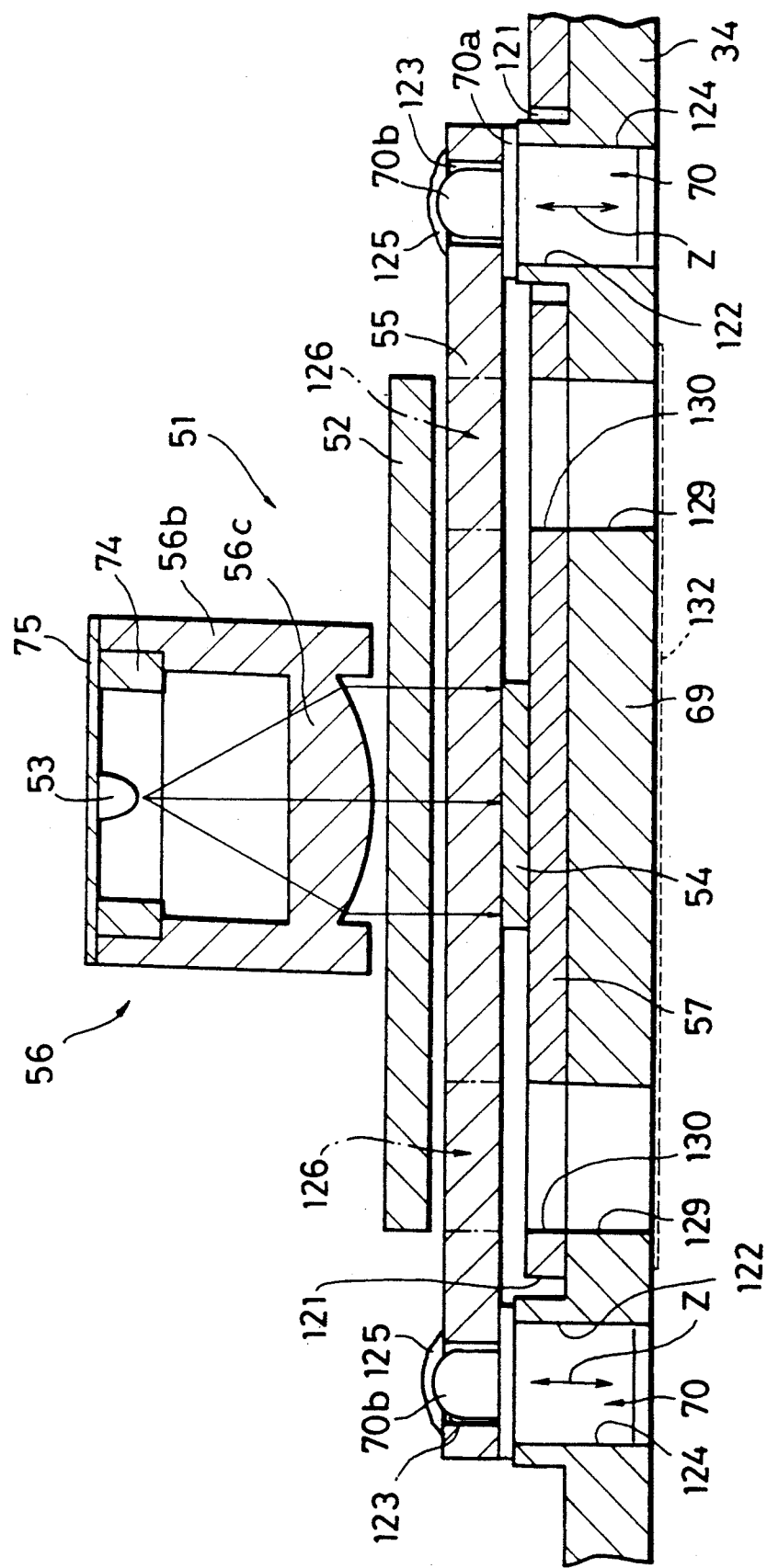
FIG. 14 is a sectional view taken along the line XIV—XIV on FIG. 13.
Figure 15:
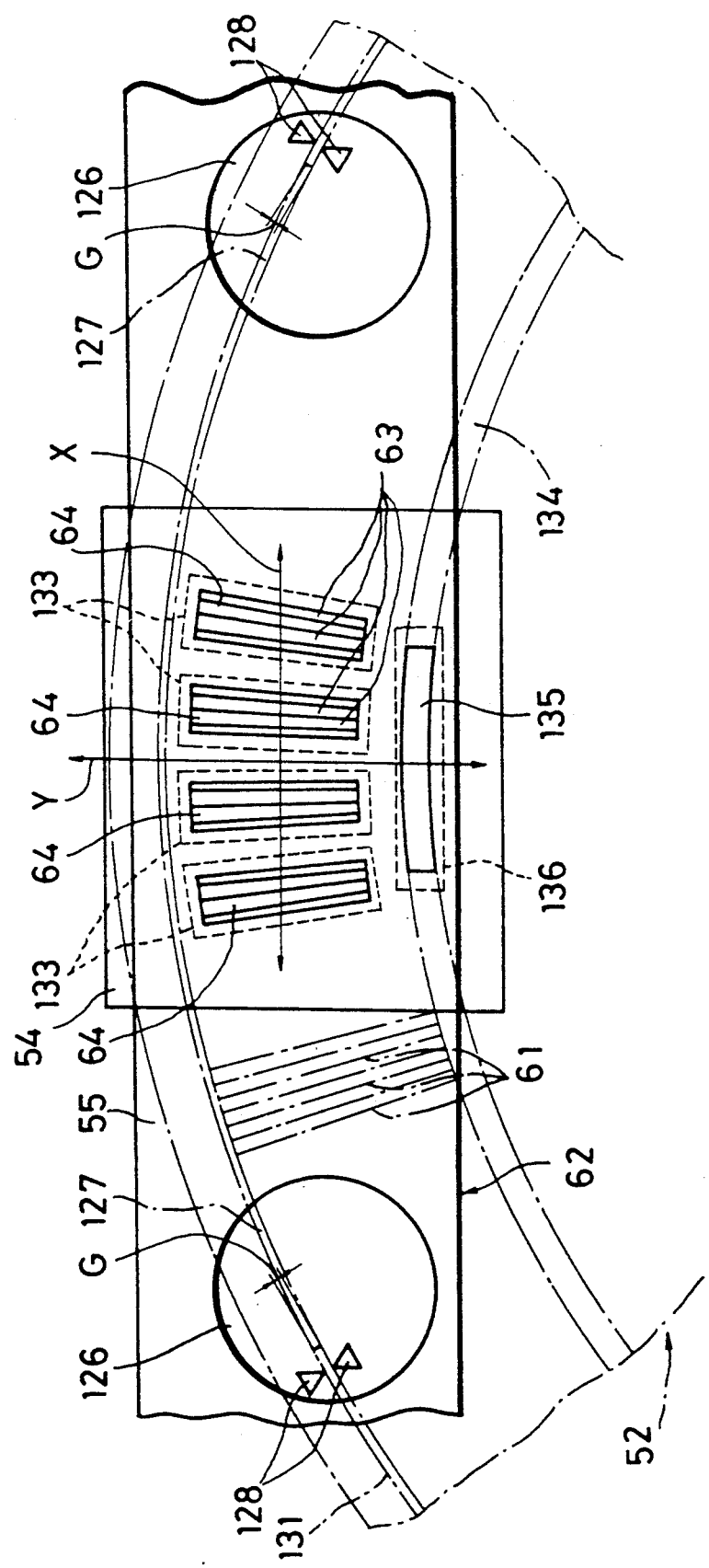
FIG. 15 is a plan view, on an enlarged scale, of the reticle plate of FIG. 13.

Next, the reticle plate 55 secured to the mounting plate 34 through the pair of pins 70, and horizontally arranged between the scale plate 52 and the light-sensitive element 54 as shown in FIG. 13 and 14, must be positioned as shown in FIG. 15, in order that the scale marks 63 of the four scales 64 provided in the reticle plate 55 are just under the scale marks 61 of the scale 62 provided in the scale plate 52.

For that reason, the pin 70 is formed to have a projection 70b which is smaller in diameter and vertically projects from the top of the pin 70. Firstly, the pair of pins 70 are fitted in a pair of holes 122 which are vertically provided in the mounting plate 34, two parts of which are fitted in a pair of through holes 121 bored in the circuit board 57, and then, the respective projections 70b of the pair of pins 70 are fitted in a pair of clearance holes 123 provided at the both ends of the reticle plate 55.

The pair of pins 70 are vertically moved in the holes 122 in a direction of arrow Z so as to adjust the height and the horizontality of the reticle plate 55, and then bonded to the mounting plate 34 by an adhesive 124. Thereafter, the reticle plate 55 is horizontally moved on the top surfaces of the pair of pins 70 in directions of arrows x and y in FIG. 13, in order that the scale marks of the reticle plate 55 are brought just under the scale marks 61 of the scale plate 52, and then the reticle plate is bonded to the pins 70 by an adhesive 125.

As shown in FIG. 15, there are a pair of transparent windows 126 on the tangentially outer sides of the four scales 64, and in each of the windows 126, an auxiliary arc-like positioning mark 127 is provided along a circle having the arm shaft 36 for its center, and having a radius a little larger than the outer sides of the scales 64. Further, a pair of triangular positioning marks 128 are provided on opposite sides of the circle. The distance G between the triangular marks 128 are the same as the width of the auxiliary mark 127.

Moreover, as shown in FIG. 14, two pairs of through holes 129 and 130 are provided in the mounting plate 34 and the circuit board 57, respectively, so as to position just under the pair of the transparent windows 126, and on the scale plate 52, a circular positioning mark 131 which has the same width as those of the auxiliary marks 127 is provided so as to enable the auxiliary marks 127 to be brought just under the positioning mark 131 as shown in FIG. 15.

When positioning of the reticle plate 55 is performed, the reticle plate 55 is moved in the directions of arrows X and Y by the help of jigs and on observations under optical microscopes which are set just over the windows 126 and the through holes 129 and 130. That is, the reticle plate 55 is moved so as to make the pair of gaps G coincide with the positioning mark 131 of the scale plate 52, and then, make the pair of auxiliary positioning marks 127 bring just under the positioning mark 131 of the scale plate 52.

According to the method described above, it can be conducted accurately and easily to position the scale marks 63 of the reticle plate 55 just under the scale marks 61 of the scale plate 52, and it is noted that the through holes 129 is sealed by a sheet 132 indicated in dotted lines in FIG. 14. That is, after the reticle plate 55 is positioned and bonded to the pins 70, the sheet 132 is put on and bonded to the lower face of the mounting plate 34.

Next, as shown in FIG. 15, the light-sensitive element 54 arranged under the reticle plate 55 has four light-sensitive portions 133 for detecting the position of the head 8. The light-sensitive portions 133 are provided just under the respective scales 64 formed in the reticle plate 55, and correspond to the respective scales 64. A circular transparent window 134 which is concentric with the circular scale 62 is disposed at the radially inner side of the scale plate 52, and in the reticle plate 55 an arc-like transparent window 135 is disposed so as to be positioned just under the transparent window 134 of the scale plate 52. Further, in the light-sensitive element 54, a light-sensitive portion 136 for reference is disposed just under the transparent window 135 of the reticle plate 55.

Figure 16:
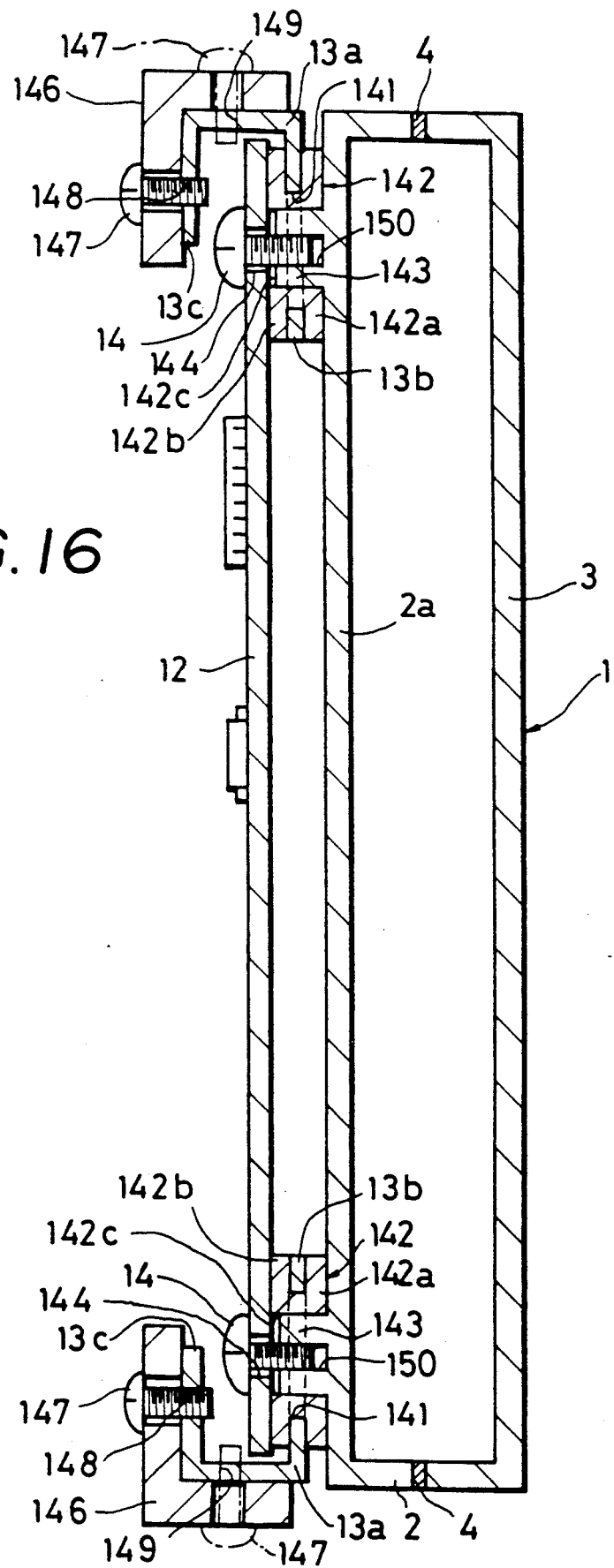
FIG. 16 is a sectional view taken along the line XVI—XVI on FIG. 12.

Next, as shown in FIGS. 12 and 16, the pair of mounting frames 13 secured to the bottom wall 2a of the receptacle 1 together with the main circuit board 12 have a U-shaped section. A pair of through holes 141 are provided in the upper flange 13b of each of the frames 13, and rubber bushings 142 with an upper flange 142a and a lower flange 142b are fitted in the respective through holes 141. Then, four projections 143 vertically projecting downwards from the bottom wall 2a of the receptacle 1 are force-fitted in the respective central holes 142c of the rubber bushings 142.

Next, the both sides of the main circuit board 12 are inserted in between the upper flange 13b and the lower flange 13c of the frame 13, and four male screws 14 inserted from below into through holes 144 provided near the both sides of the main circuit board 12 are inserted into the central holes 142c of the bushings 142, and then screwed in tapped holes 150 which are provided in the respective centers of the projections 143.

Thus, the main circuit board 12 is secured to the bottom wall 2a of the receptacle 1. It is noted that a part of the main circuit board 12 shown in FIG. 12 has a notched portion 145 in which the circular recess 30 largely projecting downwards from the bottom wall 2a is fitted.

According to the above constitution, it will be seen that the main circuit board 12 and the pair of mounting frames 13 are simply and quickly secured only with the four screws 14 to the bottom wall 2a of the receptacle 1, and the upper flange 142a and the lower flange 142b of the rubber bushing 142 are sandwiched between the bottom wall 2a and the upper flange 13b of the mounting frame 13, the upper flange 13b and the main circuit board 12, respectively. Further, the rubber bushing 142 lies between the projection 143 and the through hole 141 of the upper flange 13. Therefore, the receptacle 1 and the main circuit board 12 are elastically supported in the three dimensional space by the pair of frames 13 due to elasticity of the four rubber bushings 142.

When the apparatus is attached to a computer or the like, the webs 13a and the lower flanges 13c of the mounting frames 13 are fitted in mounting frames 146 provided on the computer or the like as shown in FIG. 16, and male screws 147 indicated in solid lies or chain-dotted lines in FIG. 16 are selectively screwed in tapped holes 148 or 149. Thus, the apparatus is elastically supported by the computer, so that its shock resistance becomes very high. In addition, the warp and the like of the mounting frames 13 caused by tightening the screws 147 are prevented by the four rubber bushings 142, so that the receptacle 1 is never warped.

As the apparatus is constructed as described above, the receptacle 1, in which two hard disks 6 of 95 mm in diameter and 1.2 mm in thickness are, for example, accommodated, is about 146 mm long, about 116 mm wide and about 15 mm high (the heights of the recesses 21 and 30 are not included) in outside measurement, and the total height $H_2$ which is the sum of the height $H_1$ of the receptacle 1 and the height of the mounting frames 13 is about 26 mm.

As shown in FIG. 3, when the plurality of hard disks 6 are rotated at high speed by the disk drive motor 7, for example, in a direction of arrow b, and head arm 9 is swung on the arm shaft 36 in a direction of arrows a and a' so as to move the plurality of the heads 8 substantially in the radius direction of the hard disks 6 within the recorded zones of the hard disks 6, which are defined by the inner limit ID and the outer limit OD in order that recording information on, or reproducing information from the hard disks are performed, the scale plate 52 of the optical encoder 51 shown in FIG. 9 is swung together with the head arm 9 in the direction of arrows a and a' on the arm shaft 36, and as shown in FIGS. 10 and 15, rays of light emitted from the light-emitting element 52 pass through the scale 62 of the scale plate 52 and the scale 64 of the reticle plate 55 in order to be received by the light-sensitive element 53. That is, the rays of light emitted downwards from the light-emitting element 53 within the cylindrical portion 56b is changed parallel rays by the lens 56c, and then, pass through the scale 62 of the scale plate 52 which is swung in the direction of arrows a and a', and the scale 64 of the fixed reticle plate 55. Then, the rays are received by the light-sensitive element 53; so that the positions of the heads 8 with respect to the hard disks 6 are detected.

At that time, the parallel rays pass in turn through the four scales 64 of the reticle plate 55 shown in FIG. 15, and are detected by the respective light-sensitive portions 133 of the light-sensitive element 54, so that two pairs of output signals, the phases of which are opposite to each other, are produced: between the two pairs, there is a 90° phase shift. Thus, the head drive motor 10 is controlled by the four outputs signals, and tracking of the head 8 is performed.

As shown in FIG. 15, a part of the parallel rays passing through the transparent window 134 of the scale plate 52 and the transparent window 135 of the reticle plate 55 is always detected by the light sensitive portion 136, and the four output signals produced by the light-sensitive portion 133 are checked by the output signal produced by the light-sensitive portion 136.

Next, as shown in FIG. 10, the lens-housing 56 has been made of transparent synthetic resin, so that a part of the rays emitted from the light-emittent element 53 and reflected irregularly within the cylindrical portion 56b of the lens-housing 56 easily passes through the cylindrical portion 56b. Thus, it is prevented that the reflected rays passing through the scale 64 of the reticle plate 55 are obliquely entered in the four light-sensitive portions 133 of the light-sensitive element 54, and thereby, the disturbance of the output signals produced by the light-sensitive portions 133 are caused.

Next, the circular scale plate 52 of the optical encoder 51 is made of a single glass plate or the like, so that if the atmospheric temperature changes, the scale plate 52 uniformly expands or contracts in the radius direction of the arm shaft 36, the center of which coincides with that of the scale plate 52. Therefore, the scale marks 61 engraved in the scale plate 52 in the radius direction of the arm shaft 36 never moves in the tangential direction of the arm shaft 36 due to change of the atmospheric temperature. Thus, in the apparatus of the present invention, the position of the head 8 is always detected accurately, if the atmospheric temperature changes, so that thermal offtrack errors are not produced, and as the result, it becomes possible to record information in high density on the hard disk 6.

Next, the scale plate 52 of the optical encoder 51 is directly secured to the arm shaft 36 and swung together with the head arm 9 on the arm shaft 36, so that inertia of the head arm 9 and scale plate 52 can be reduced. Thus, the head arm 9 is swingable at high speed by the head drive motor 10 in the direction of arrows a and a' so as to move the head 8 at high speed.

Next, the scale plate 52 of the optical encoder 51 is mounted on the arm shaft 36 in such a way that the boss 39 of the head arm 9 is fitted in the circular hole 58 is provided at the center of the scale plate 52, so that it easy to make the center of the scale plate 52 coincide with the center of the head arm 9, and it is possible to automatically and accurately assemble the head arm 9 and the scale plate 52 into a unit and automatically mount them on the arm shaft 36.

Moreover, it can also be conducted automatically that after the boss 39 of the head arm 9 is fitted in the circular hole 58 of the scale plate 52 and is mounted on the arm shaft 36, the center of the scale plate 52 is made to coincide with the center of the arm shaft 36 by optically examining the outer periphery of the scale 62, the transparent window 134, etc. of the scale plate 52; the lock washer 59 is mounted on the boss 39; and the scale plate 52 is bonded to the boss 39 with the adhesive.

At that time, if the scale plate 52 is formed as a disk, and the scale 62 is formed circularly (annularly), it is not necessary to correct the inclination of the scale 52 and the head arm 9 at the time of incorporating the scale plate 52, so that it becomes very easy to incorporate the scale plate 52 automatically.

Next, if the scale plate 52 of the optical encoder 51 expands or contracts due to change of the atmospheric temperature, the position of the floating head 8 is always detected accurately, so that the coefficient of expansion of the scale plate 52 can be free in value. Therefore, it is possible to make the scale plate 52 of cheap materials, such as glass, to reduce the cost of the optical encoder 51.

In the apparatus of the present invention, as soon as a signal is given to stop recording information on or reproducing information from the hard disk 6, current flows to both the stator coil of the disk drive motor 7 and the coil 81 of the head drive motor 10 are stopped. At that time, a small back electromotive force of the stator coil is produced by the inertia of the rotor 25 of the disk drive motor 7, and thereby, a current is supplied to the coil 81 of the head drive motor 10 so as to swing the head arm 9 in the direction of arrow a in FIG. 9.

Thus, the floating head 8 moves in the direction of arrow a beyond the recorded zone which is defined by the inner limit ID indicated in dot-and-dash lines and the outer limit OD indicated in two-dots-and-dash lines in FIG. 9. The head arm 9 brought to a position indicated in solid lines in FIG. 9 is attracted to the iron core 110a of the electromagnet 110 which functions as a inner stop 102, through the moving iron 111 which is attached to the head arm 9 and locked. A shock produced when the moving iron 111 is hit against the iron core 110a, is absorbed by the rubber plate 109.

At the time of recording or reproducing, a small pulse current is fed to the 110b of the electromagnet 110 to weaken the attractive force of the moving iron 111, and thereby, the head arm 9 is unlocked. Further, a current is supplied to the coil 81 of the head drive motor 10, and the head arm 9 is swung in the direction of arrow a'. Thus, the floating head 8 is returned to the recorded zone. It is noted that if the head arm 9 is unexpectedly swung in the direction of arrow a', for example while the apparatus is assembled, the head arm 9 hit against the rubber 104 of the outer stop 101, and the shock is absorbed.

According to the apparatus of the invention, the head arm 9 and the optical encoder 51 are mounted on the single mounting plate 34 so as to constitute a modular encoder assembly 11, and the encoder assembly 11 is mounted on and demounted from the sealed receptacle 1 through the mounting plate 34 with the plurality of screws 35. Therefore, it can be simply conducted to set the optical encoder assembly 11 in the receptacle 1 after the assembly 11 is assembled and adjusted at the outside of the receptacle 1. Thus, it becomes easy to assemble, disassemble, adjust, or repair the apparatus, or change the encoder assembly 11.

Moreover, according to the apparatus of the invention, the optical encoder assembly 11 is so constituted as to be capable of being easily joined to other parts or units, so that it becomes possible to use the optical encoder assembly 11 as the common part of disk recording and/or reproducing apparatuses of various kinds so as to reduce their manufacturing cost.

In addition, according to the apparatus of the invention, the circuit board 57 which includes a circuit necessary for detecting the position of the floating head 8 of the optical encoder 51, is provided in the mounting plate 34 of the optical encoder assembly 11, so that the optical encoder assembly 11 is easily joined mechanically and electrically to other parts or units, and as the result, it becomes easy to mechanically and electrically assemble, disassemble, adjust or repair the apparatus, or change the optical encoder assembly 11, when the optical encoder assembly 11 is used as the common part of the disk recording and/or reproducing apparatuses of various kinds.

Morever, as shown in FIG. 10, the height of the optical encoder assembly 11 accommodated in and secured to the receptacle 1, can be made very small when measured from the top surface of the bottom wall 2a of the receptacle 1, so that the height of the receptacle 1 shown in FIG. 2 can also be made very small (, for example, about 15 mm).

Next, the optical encoder 51 is completely sealed in the receptacle 1, the circular openings 22 and 31 provided in the bottom wall 2a of which are completely closed, so that it is unnecessary to provide a cover for giving shade, or excluding dust on the outside of the bottom wall 2a. Therefore, it is possible to reduce the number of parts and simplify the steps required for the assembly of the apparatus.

Figure 17:
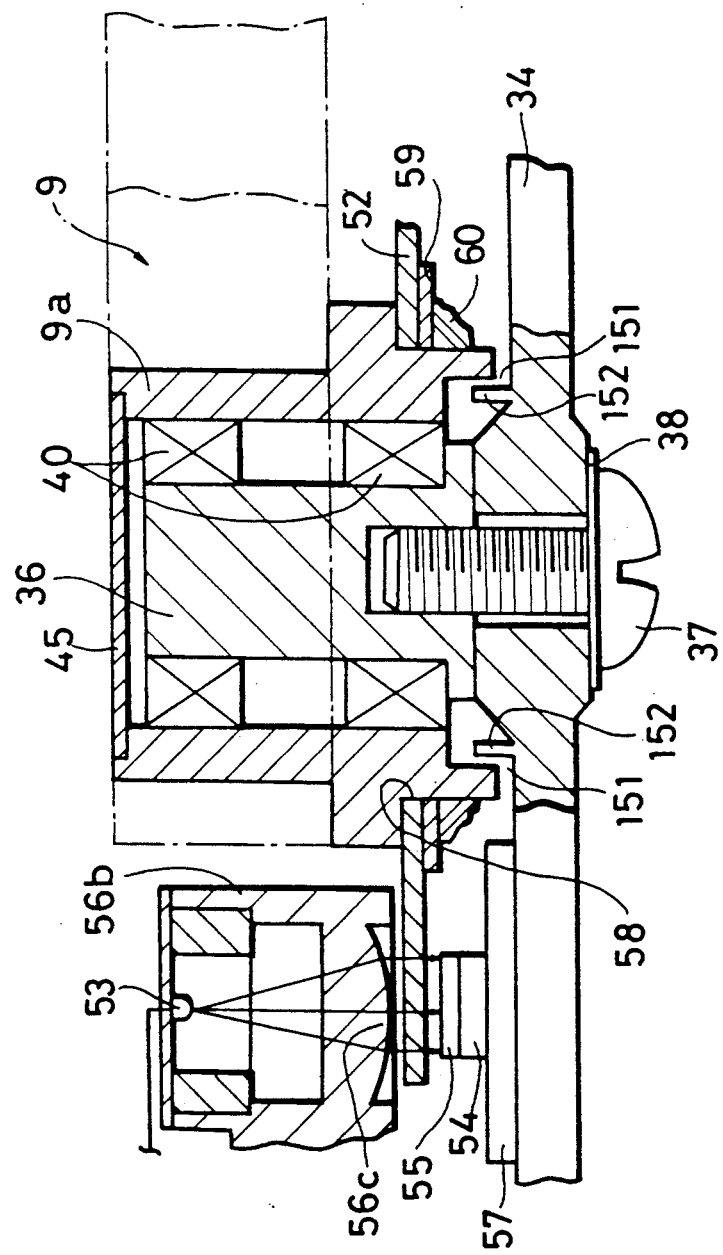
FIG. 17 is a sectional view of a modified optical encoder assembly.
Figure 18:
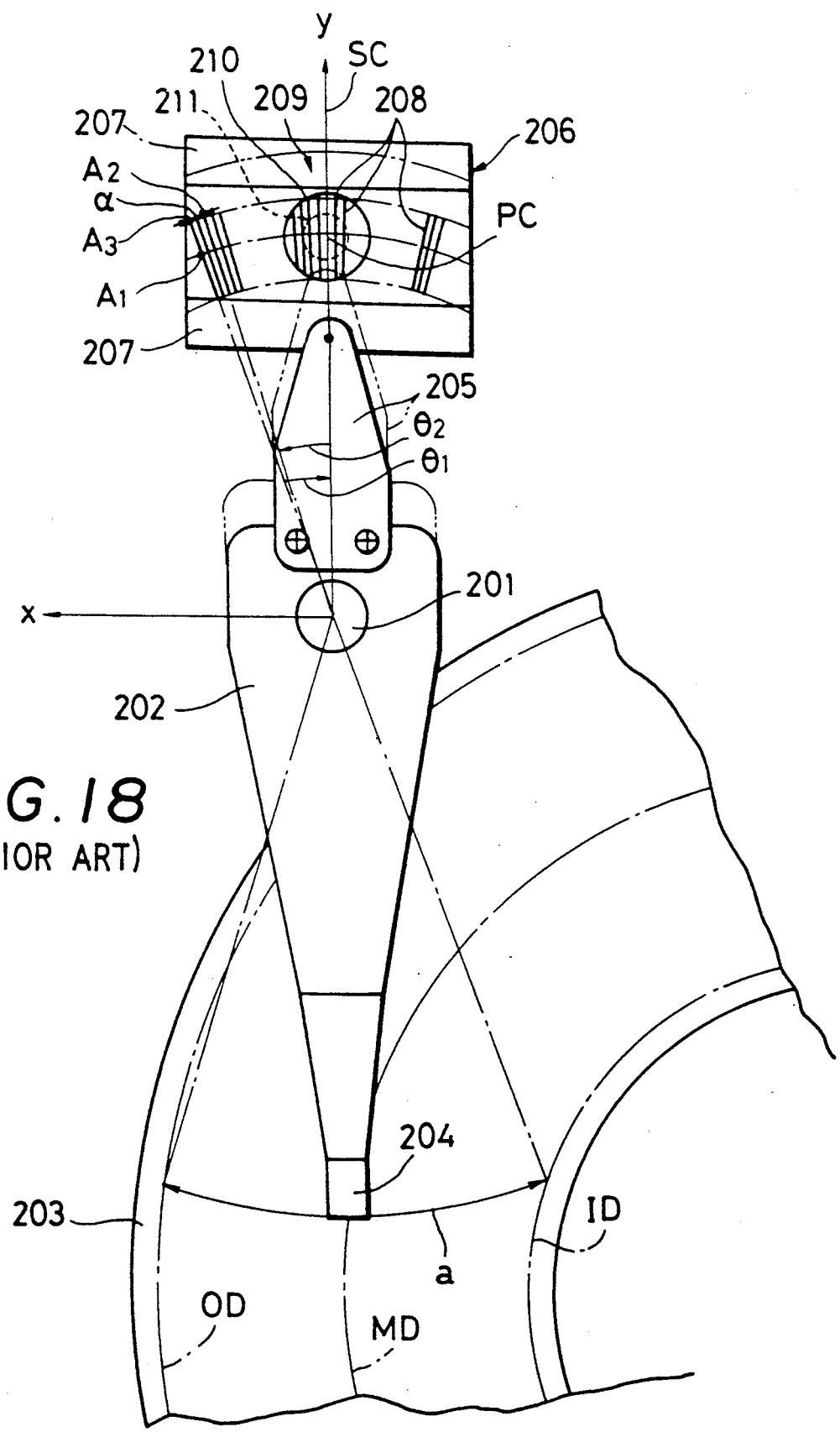
FIG. 18 is a plan view of a well-known optical encoder.

Next, as shown in FIG. 10, the circular lid 45 secured to the top of the boss 39 with adhesives or the like, prevents grease, dust, etc. of the bearings 40 from scattering into the sealed receptacle 1 through the top opening of the boss 39, but if an annular projection 152 projecting upwards from the mounting plate 34 is provided as shown in FIG. 17, and arranged to protrude in an annular gap 151 which is formed between the lower end of the boss 39 and the upper surface of the mounting plate 34, it is prevented that grease, dust, etc. of the bearing 40 scatter into the sealed receptacle 1 through the gap 151, because a labyrinth is formed in the gap 151.

In the above embodiment, though the arm shaft 36 of the optical encoder assembly 11 is fixedly secured to the mounting plate 34, it may be rotatably secured to the mounting plate 34, and both the head arm 9 and the scale plate 52 may be fixed thereto.

Moreover, though the scale plate 52 of the optical encoder 51 is formed into a disk, it may be formed into other shapes, such as a sector.

What is claimed is:

1. A disk recording and/or reproducing apparatus for recording information on and/or reproducing information from a disk-like recording medium by means of a head, the disk recording and/or reproducing apparatus comprising:
   a sealed receptacle;
   a disk drive motor accommodated in said receptacle, and capable of rotating said disk-like recording medium;
   a head arm accommodated in said receptacle, and supported for swinging motion on an arm shaft, whereby said head is movable in an arc in substantially a radial direction relative to said disk-like recording medium;
   a head drive motor accommodated in said receptacle, and capable of making said head arm swing on said arm shaft;
   an optical encoder accommodated in said receptacle and capable of detecting positions of said head with respect to said disk-like recording medium;
   wherein said optical encoder has a scale plate which is swung together with said head arm and mounted directly on said arm shaft, and said scale plate consists of a single integral scale plate member formed in one piece;
   a light-emitting element arranged on one side of said scale plate, said scale plate having scale marks which are engraved in said scale plate in a radial direction relative to said arm shaft;
   a light-sensitive element arranged on the other side of said scale plate from said light-emitting element; and
   a reticle plate arranged between said light-sensitive element and said scale plate, so that light emitted from said light-emitting element and passing through said scale plate and reticle plate, is absorbed by said light-sensitive element, and thus, positions of said head with respect to said disk-like recording medium can be detected due to a signal generated by said light-sensitive element, because said scale plate is swung together with said head arm.

2. A disk recording and/or reproducing apparatus for recording information on and/or reproducing information from a disk-like recording medium by means of a head, the disk recording and/or reproducing apparatus comprising:
   a sealed receptacle;
   a disk drive motor accommodated in said receptacle, and capable of rotating said disk-like recording medium;
   a head arm accommodated in said receptacle, and supported for swinging motion on an arm shaft, whereby said head is movable in an arc in substantially a radial direction relative to said disk-like recording medium;
   a head drive motor accommodated in said receptacle, and capable of making said head arm swing on said arm shaft;
   an optical encoder assembly having a mounting plate, said head arm, which is secured to said mounting plate and swingable on said arm shaft, and an optical encoder so disposed on said mounting plate as to be mounted in and demounted from said receptacle;
   wherein said optical encoder has a scale plate which is swung together with said head arm and mounted directly on said arm shaft, and said scale plate consists of a single integral scale plate member formed in one piece;
   a light-emitting element and a light-sensitive element provided on said mounting plate, on opposite sides of said scale plate, said scale plate having scale marks which are engraved therein in a radial direction relative to said arm shaft; and
   a reticle plate arranged between said light-sensitive element and said scale plate, and disposed on said mounting plate, so that light emitted from said light-emitting element and passing through said scale plate and reticle plate is absorbed by said light-sensitive element, and thus, positions of said head with respect to said disk-like recording medium can be detected due to a signal generated by said light-sensitive element, because said scale plate is swung together with said head arm.

3. A disk recording and/or reproducing apparatus according to claim 2, wherein secured to said optical encoder assembly is a circuit board which has a circuit of detecting positions of said head.

* * * * *